April 21, 1925.

R. BANCROFT 1,534,293

BRAKING MECHANISM

Filed Sept. 13, 1923  2 Sheets-Sheet 1

INVENTOR.
Roy Bancroft
BY Joseph B. Gardner
ATTORNEY.

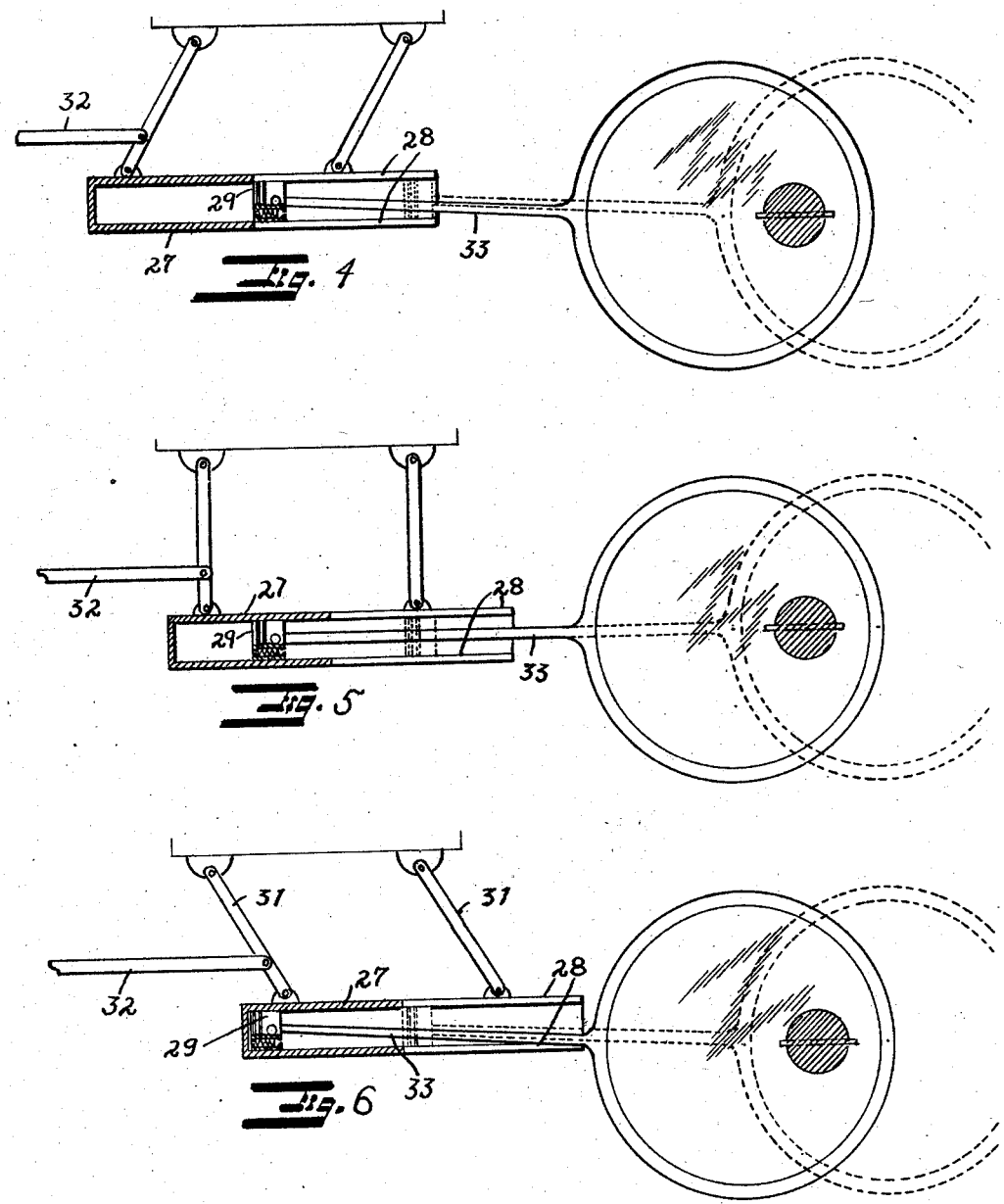

Patented Apr. 21, 1925.

1,534,293

UNITED STATES PATENT OFFICE.

ROY BANCROFT, OF OAKLAND, CALIFORNIA, ASSIGNOR OF ONE-HALF TO JOHN P. GALLAGHAN, OF OAKLAND, CALIFORNIA.

BRAKING MECHANISM.

Application filed September 13, 1923. Serial No. 662,417.

*To all whom it may concern:*

Be it known that I, ROY BANCROFT, a citizen of the United States, and a resident of Oakland, county of Alameda, and State of California, have invented a new and useful Braking Mechanism, of which the following is a specification.

My invention relates to braking mechanism for use with revolving shafts and, in the present embodiment, the braking mechanism is particularly adapted for use in connection with the driving axle of a motor driven vehicle.

An object of my invention is to provide a braking mechanism for revolving shafts which is manually operatable with a minimum of manual force.

Another object of my invention is to provide braking mechanism for a revolving member in which the motion of the member provides the necessary energy for braking.

A further object of my invention is to provide a braking force which is intermittent in action.

A still further object of my invention is to provide mechanism adapted to produce a braking force which automatically increases to a safe maximum with the time of operation of the braking mechanism.

A further object of my invention is to provide a braking mechanism for shafts rotatable at different relative speeds, wherein the available braking forces acting on said shafts at any instant will be substantially equal.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings which are more or less diagrammatic:

Figures 4, 5 and 6 are views of another embodiment of my invention showing it in different operative positions.

Figure 1:
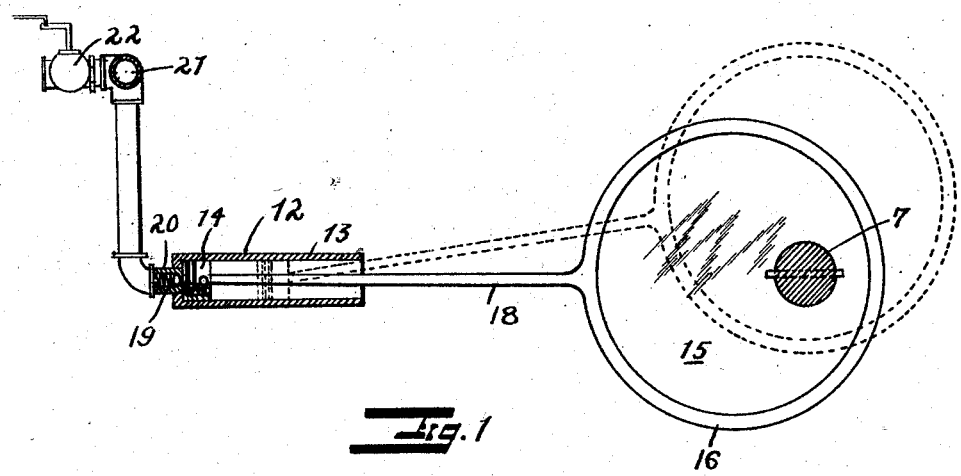
Figure 1 is an elevation partly in section of the braking mechanism of my invention.
Figure 2:
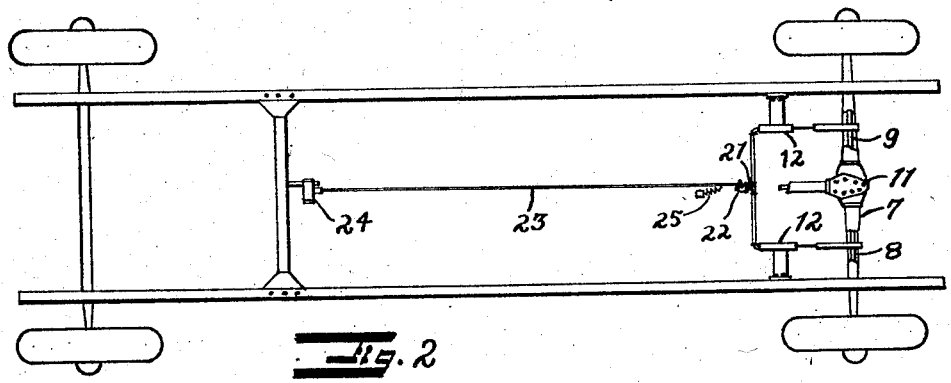
Figure 2 is a plan view of the chassis of a motor driven vehicle equipped with the apparatus.
Figure 3:
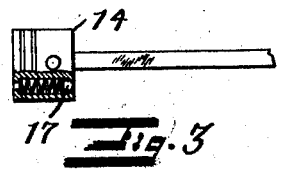
Figure 3 is a view partly in section, of a type of piston which may be used in the mechanism.

The types of brakes with which motor vehicles are usually equipped involve frequent renewal of brake linings and adjustments of brake rods. Furthermore, considerable physical effort must be usually exerted in the operation of such devices, which is particularly tiring to the operator of a vehicle. Then too the usual type of brake is prone to abruptly lock the wheels and thus cause skidding with its attendant dangers. These and other disadvantages of the usual vehicle braking equipment are effectively overcome in the device of my invention, as will appear in the description and discussions following:

Briefly expressed, the braking mechanism of my invention comprises a normally idling pressure generating means adapted to be continuously operated by a rotating member against the rotation of which a braking force is to be applied. Upon partial or complete restriction of the fluid discharge from the pressure generating means a pressure will be built up therein which opposes the action and thereby reacts to resist the rotation of said rotating member. It will thus be evident that the rotating member itself provides the necessary braking energy, thereby eliminating the necessity for a separate source of energy for braking.

As here particularly set forth, the device is shown applied to the drive shafts of a motor vehicle, separate pressure generating means being operatively connected to each of the shafts. To insure equality of braking force for both shafts, the outlet valves of the pressure generators communicate with a common chamber having a normally open control valve. The partial or complete closing of the latter valve then acts to cause the building up of a pressure in the chamber which reacts to oppose the operation of the pressure generating means and the rotation of the shafts which drive them.

A detailed description follows:—

As previously stated, the braking mechanism in the present embodiment of the invention, is applied to the driving axle 7 of a motor vehicle. As is usual in motor driven vehicles, the axle includes a pair of axially aligned shafts 8 and 9 which are operatively connected and driven through suitable differential gearing arranged in a housing 11. Operatively associated with the shafts 8 and 9 are independent pressure generating means here shown in the form of force pumps 12. Each of the latter includes a cylinder 13 suitably positioned in fixed relation to the axis of the associated shaft, and having a piston 14 reciprocatively mounted therein. Movement of the piston is arranged to be effected by converting the rotative motion of the shaft into rectilinear movement. As here shown, said conversion is made by means of an eccentric disc 15 fixed on the shaft and engaged by a strap 16 provided on the outer end of a connecting rod 18 which is pivotally secured to the piston.

The piston 14 is preferably provided with a suitable intake valve 17. As illustrated, the cylinder 9 is open at the end nearest the shaft and is closed at the other end, the latter end having arranged therein a suitable outlet valve 19 discharging into a discharge passage 20.

The discharge passages 20 of both of the pumps are connected together to form a common passage or chamber 21, and means are provided, such as a control valve 22, for controlling the discharge of the fluid from said chamber. The valve 22 is arranged to be manipulated manually by means of a rod 23 connected to a suitable lever 24 positioned within operative reach of the driver. The valve 22 is arranged to be normally held in open position by means of a spring 25 suitably connected to the lever.

The discharge passages and chamber are of such cross-sectional area that when the valve 22 is in open position an unrestricted discharge of fluid from the pumps is permitted. In this manner since there is practically no resistance to pumping there will be no braking force exerted in the associated shaft. However, when the control valve 22 is operated to restrict the discharge of fluid, a corresponding back pressure will be developed and a proportionate braking force will be produced opposing rotation of the shafts.

By virtue of the fact that both pumps discharge into the common chamber 21, it will be evident that, notwithstanding the fact that the shafts may rotate at different relative speeds, the available braking forces acting on said shafts will at any instant be equal. It is to be further noted that the pressure in the chamber 21 will reach the maximum value only after a number of strokes of one or both pistons, thereby avoiding the possibility of a too sudden application of the maximum braking force. Furthermore, the danger of skidding is lessened on account of the reciprocative action of the device, since a true locking of the wheels is prevented, through the alternate application and release of the braking pressure.

In Figures 4 to 6, a modified form of the invention is shown. In this embodiment, the force of compression and corresponding braking reaction are varied by changing the relative positions of the cylinder with respect to the axle. The cylinder 27 in this case, is formed so that the bore length thereof exceeds twice the length of a piston stroke, thus allowing a change in the relative positioning of the cylinder and axle through the length of a complete stroke. As here shown, the cylinder is afforded the desired movement by being pivotally suspended on parallel links 31, movement thereof being effected by means of a rod 32 suitably connected to the links and operatable by the driver through a suitable arrangement of levers (not shown). Formed in the walls of the cylinder are openings 28 which serve both as inlet and outlet ports for which the piston 29 driven by the axle functions as a slide valve. The openings 28 are positioned and formed to allow the necessary clearance of the piston connecting-rod 33. It will now be evident that when the cylinder is in a position furthest removed from the shaft as shown in Figure 4 the apertures 28 will provide an outlet from the cylinder throughout an entire stroke of the piston, thereby preventing the creation of pressure in the cylinder and permitting the idling of the device. If the cylinder is positioned nearer the shaft as shown in Figure 5, the apertures 28 serve as outlet valves for only part of a piston stroke, the remaining portion of the stroke serving to compress the imprisoned air and thus create a back pressure for braking. When the cylinder is positioned nearest the shaft, as shown in Figure 6, the apertures 28 do not communicate with the compression chamber during any part of a piston stroke and a maximum compression is thus provided. From the foregoing it will be evident that the magnitude of the braking force is entirely controlled by the relative positions of the cylinder and shaft, any desired maximum being provided through adjustment of the amount of clearance at the end of a stroke.

I claim:

1. Braking mechanism comprising in combination with a pair of rotatable members adapted for variable relative speeds, independent fluid-pressure-generating means operated by each of said members, a common discharge chamber associated with said generating means, and means for controlling the discharge of the fluid from said chamber.

2. A braking mechanism for revolving shafts operated by differential gearing comprising force pumps operated independently by each of said shafts, a common chamber into which said pumps are adapted to discharge, and means for controlling the discharge from said chamber.

3. A braking mechanism for rotatable members adapted for variable relative speeds comprising force pumps continuously operated by each of said members independently of each other, a common discharge chamber for said pumps, and means for varying the discharge of fluid from said chamber.

4. A braking mechanism for shafts cooperating to drive different wheels of a power driven vehicle at different relative speeds, force pumps continuously operated by each of said shafts independently of each other and communicating with a common normally unrestricted discharge passage, and means operatable by the driver of the vehicle for restricting the discharge through said passage.

5. Braking mechanism comprising in combination with a pair or rotatable members adapted for variable relative speeds, fluid pressure generating means operated independently by said members, means for equalizing the pressure generated independently by said members, and means for controlling the flow of fluid after the pressure is equalized.

6. Braking mechanism comprising in combination with a pair of rotatable members adapted for variable relative speeds, independent fluid pressure generating means operated by each of said members, and means for equalizing the pressure generated by said means.

7. Braking mechanism comprising in combination with a pair of rotatable members adapted for variable relative speeds, independent fluid pressure generating means operated by each of said members, means for equalizing the pressure generated by said independent means, and means for controlling the flow of fluid after the pressure has been equalized.

In testimony whereof, I have hereunto set my hand at Oakland, this fourth day of September, 1923.

ROY BANCROFT.